United States Patent
Lutz et al.

(10) Patent No.: US 12,510,119 B2
(45) Date of Patent: Dec. 30, 2025

(54) HAND-HELD POWER TOOL

(71) Applicant: Robert Bosch GmbH, Stuttgart (DE)

(72) Inventors: Manfred Lutz, Filderstadt (DE); Elmar Feder, Leonberg (DE); Dietmar Schneider, Denkendorf (DE)

(73) Assignee: Robert Bosch GmbH, Stuttgart (DE)

( * ) Notice: Subject to any disclaimer, the term of this patent is extended or adjusted under 35 U.S.C. 154(b) by 582 days.

(21) Appl. No.: 17/613,872

(22) PCT Filed: May 18, 2020

(86) PCT No.: PCT/EP2020/063813
§ 371 (c)(1),
(2) Date: Nov. 23, 2021

(87) PCT Pub. No.: WO2020/239498
PCT Pub. Date: Dec. 3, 2020

(65) Prior Publication Data
US 2022/0243769 A1    Aug. 4, 2022

(30) Foreign Application Priority Data
May 29, 2019   (DE) ................... 10 2019 207 973.3

(51) Int. Cl.
*F16C 35/04*     (2006.01)
*B24B 23/02*     (2006.01)
(Continued)

(52) U.S. Cl.
CPC ............ *F16C 35/042* (2013.01); *B25F 5/008* (2013.01); *B25F 5/02* (2013.01); *F16C 35/067* (2013.01); *B24B 23/028* (2013.01)

(58) Field of Classification Search
CPC ...... F16C 35/042; F16C 35/067; B25F 5/008; B25F 5/02; B24B 23/028
(Continued)

(56) References Cited

U.S. PATENT DOCUMENTS 3,481,655 A * 12/1969 Campbell ............. F16C 35/077
384/536
3,693,035 A * 9/1972 Ostwald ................ H02K 7/145
310/216.128
(Continued)

FOREIGN PATENT DOCUMENTS

CN        1136491 A    11/1996
CN      101977729 A     2/2011
(Continued)

OTHER PUBLICATIONS

International Search Report corresponding to PCT Application No. PCT/EP2020/063813, mailed Sep. 2, 2020 (German and English language document) (5 pages).

*Primary Examiner* — Dariush Seif
(74) *Attorney, Agent, or Firm* — Maginot, Moore & Beck LLP

(57) ABSTRACT

A hand-held power tool, in particular an angle grinder, includes a drive unit, a machine housing, in particular having a first housing part, which is designed as a transmission housing, and a second housing part, which surrounds the drive unit, and a bearing unit, in particular a bearing housing, for supporting the drive unit. The bearing unit protrudes into the first housing part.

18 Claims, 10 Drawing Sheets

(51) Int. Cl.
*B25F 5/00* (2006.01)
*B25F 5/02* (2006.01)
*F16C 35/067* (2006.01)

(58) Field of Classification Search
USPC ........................................................ 173/213
See application file for complete search history.

(56) References Cited

U.S. PATENT DOCUMENTS

| | | | | |
|---|---|---|---|---|
| 3,908,139 | A * | 9/1975 | Duncan, Jr. | H02K 7/145 310/43 |
| 4,113,326 | A * | 9/1978 | Brewster | H02K 5/1732 384/425 |
| 4,342,490 | A * | 8/1982 | Swinley | F16C 35/042 384/489 |
| 4,404,706 | A * | 9/1983 | Loyd | A47L 5/14 415/121.3 |
| 4,593,811 | A * | 6/1986 | Sirefelt | F16C 35/067 198/842 |
| 7,753,137 | B2 * | 7/2010 | Aeberhard | F16D 43/02 173/217 |
| 8,006,778 | B2 * | 8/2011 | Wiker | B25F 5/006 173/171 |
| 8,152,601 | B2 * | 4/2012 | Zaiser | F16D 1/101 451/357 |
| 10,058,926 | B2 * | 8/2018 | Aoki | B24B 23/04 |
| 10,971,966 | B2 * | 4/2021 | Kuehne | F16J 15/447 |
| 11,000,933 | B2 * | 5/2021 | Ishikawa | B25F 5/008 |
| 11,374,467 | B2 * | 6/2022 | Lv | B25F 5/008 |
| 2005/0089817 | A1 * | 4/2005 | Kuhn | A61C 1/185 433/114 |
| 2007/0214756 | A1 * | 9/2007 | Lee | B01D 45/12 55/419 |
| 2007/0295521 | A1 * | 12/2007 | Wiker | B24B 23/028 173/162.1 |
| 2007/0295522 | A1 * | 12/2007 | Bohne | B25D 17/24 173/162.2 |
| 2008/0202784 | A1 * | 8/2008 | Stierle | B25F 5/006 173/162.1 |
| 2011/0014857 | A1 * | 1/2011 | Bogardi | B25F 5/02 451/344 |
| 2011/0171887 | A1 * | 7/2011 | Tanimoto | H02K 5/207 310/50 |
| 2011/0278033 | A1 * | 11/2011 | Song | B25B 21/02 173/170 |
| 2012/0111595 | A1 * | 5/2012 | Schadow | B25F 5/006 173/162.2 |
| 2012/0118599 | A1 * | 5/2012 | Schadow | B25F 5/006 173/162.2 |
| 2012/0187782 | A1 * | 7/2012 | Esenwein | B25F 5/02 310/43 |
| 2013/0209017 | A1 * | 8/2013 | Schadow | B24B 41/007 267/141 |
| 2014/0029881 | A1 * | 1/2014 | Wassenhoven | F16C 33/581 384/456 |
| 2014/0133898 | A1 * | 5/2014 | Tussing | B25F 3/00 403/103 |
| 2014/0265079 | A1 * | 9/2014 | Spielvogel | F16F 1/324 267/163 |
| 2015/0034347 | A1 * | 2/2015 | Hess | B25F 5/006 173/217 |
| 2015/0135541 | A1 * | 5/2015 | Wierzchon | B25F 5/006 279/144 |
| 2015/0328742 | A1 * | 11/2015 | Schuele | B25F 5/00 173/217 |
| 2016/0010693 | A1 * | 1/2016 | Beck | F16C 33/586 264/263 |
| 2017/0008160 | A1 * | 1/2017 | Simma | B25F 5/001 |
| 2017/0106491 | A1 * | 4/2017 | Ishikawa | B24B 37/20 |
| 2017/0136614 | A1 * | 5/2017 | Takeda | B25F 5/008 |
| 2017/0239802 | A1 * | 8/2017 | Aoki | B25F 5/008 |
| 2017/0348843 | A1 * | 12/2017 | Barth | B24B 23/028 |
| 2017/0361416 | A1 | 12/2017 | Lutz et al. | |
| 2017/0373615 | A1 * | 12/2017 | Lewis | H02K 7/145 |
| 2018/0009098 | A1 * | 1/2018 | Nagasaka | B25F 5/026 |
| 2018/0283508 | A1 * | 10/2018 | Aoki | B25F 5/02 |
| 2018/0319001 | A1 * | 11/2018 | Zhong | B25F 5/006 |
| 2018/0337575 | A1 * | 11/2018 | Sengiku | H01R 13/516 |
| 2019/0047115 | A1 * | 2/2019 | Nakamura | B25F 5/02 |
| 2019/0099873 | A1 * | 4/2019 | Zhang | H02K 7/145 |
| 2019/0152018 | A1 * | 5/2019 | Fan | B24B 23/028 |
| 2019/0168371 | A1 * | 6/2019 | Aoki | B27B 19/006 |
| 2019/0168372 | A1 * | 6/2019 | Aoki | B25F 3/00 |
| 2019/0299307 | A1 * | 10/2019 | Jensen | B23D 49/162 |
| 2019/0299387 | A1 * | 10/2019 | Kotsuji | B25F 5/02 |
| 2019/0358769 | A1 * | 11/2019 | Miyazawa | B24B 23/02 |
| 2019/0366502 | A1 * | 12/2019 | Aoki | B25F 5/02 |
| 2020/0055159 | A1 * | 2/2020 | Sakai | B24B 47/12 |
| 2021/0078132 | A1 * | 3/2021 | Takeuchi | B24B 47/26 |
| 2021/0099052 | A1 * | 4/2021 | Suzuki | H02K 7/145 |
| 2021/0260745 | A1 * | 8/2021 | Miyazawa | B25F 5/008 |

FOREIGN PATENT DOCUMENTS

| | | |
|---|---|---|
| CN | 102149515 A | 8/2011 |
| CN | 102470525 A | 5/2012 |
| CN | 102655991 A | 9/2012 |
| CN | 104853879 A | 8/2015 |
| CN | 109676572 A | 4/2019 |
| DE | 10 2008 000 728 A1 | 9/2009 |
| DE | 10 2012 223 969 A1 | 6/2014 |
| DE | 11 2014 001 040 T5 | 11/2015 |
| DE | 10 2015 221 682 A1 | 5/2017 |
| EP | 2 754 535 A2 | 7/2014 |
| GB | 2 297 871 B | 6/1997 |
| JP | 2001-9757 A | 1/2001 |
| JP | 2006-297544 A | 11/2006 |
| KR | 10-2021-0028426 A | 3/2021 |
| WO | 2010/087235 A1 | 8/2010 |
| WO | 2011/015450 A1 | 2/2011 |

* cited by examiner

HAND-HELD POWER TOOL

This application is a 35 U.S.C. § 371 National Stage Application of PCT/EP2020/063813, filed on May 18, 2020, which claims the benefit of priority to Serial No. DE 10 2019 207 973.3, filed on May 29, 2019 in Germany, the disclosures of which are incorporated herein by reference in their entirety. The disclosure relates to a hand-held.

BACKGROUND

DE 10 2015 221 682 A1 discloses a motor adapter for an electric power tool, which motor adapter is provided for geometric adaptation of an electric motor to a motor housing, with a main body which has a stator receiving region which is provided at least partially for receiving a stator of the electric motor.

SUMMARY

The disclosure is based on the object of improving a hand-held power tool or a hand-held power tool apparatus by way of simple structural measures.

The object is achieved by way of a hand-held power tool, in particular an angle grinder, with a drive unit, with a machine housing, in particular comprising a first housing part which is configured as a transmission housing and a second housing part which surrounds the drive unit, and with a bearing unit, in particular a bearing housing, for mounting the drive unit.

It is proposed that the bearing unit protrudes into the first housing part.

As a result, a particularly compact hand-held power tool can be provided. By virtue of the fact that the bearing unit protrudes into the first housing part, the entire drive unit can be of more compact configuration by, for example, it being possible for a shorter drive shaft to be selected and, in addition, it being possible for a bearing arrangement for mounting the drive shaft to be arranged in the first housing part, in particular completely. On account of the bearing unit which protrudes into the first housing part, the drive unit can be displaced further in the direction of the first housing part, as a result of which the second housing part can be of more flexible design and therefore ergonomics can be increased.

The hand-held power tool can be configured as an angle grinder. It goes without saying that the hand-held power tool can also be configured as another hand-held power tool which appears appropriate to a person skilled in the art, such as, for example, a drill/screwdriver, a hammer drill, a hand-held milling cutter or the like. The hand-held power tool can be configured as a portable, transportable hand-held power tool which is to be held by way of a hand of an operator. The hand-held power tool is not to exceed a weight of preferably 40 kg, preferably of 20 kg, particularly preferably of 10 kg.

In this context, a "drive unit" is to be understood to mean, in particular, a unit which is provided to generate at least one drive torque and to provide it for forwarding to an output unit, in particular to an insertion tool. The hand-held power tool advantageously has the drive unit. The drive unit particularly advantageously has at least one electric motor. The drive unit can have a drive shaft. The drive unit can be configured as an electronically commutated motor or as a brush-commutated motor. In particular, the drive unit is connected to an output unit. The output unit can have a receptacle for receiving a tool, in particular an insertion tool, which is provided to transmit a working movement to a workpiece to be machined. Here, the drive unit can convert, for example, a rotational movement into a translational and/or rotational movement of the tool, in particular of the insertion tool.

In particular, the machine housing forms an outer housing of the hand-held power tool. The machine housing is provided to be gripped around by an operator. The machine housing can have a first housing part which is configured as a transmission housing. The transmission housing can surround a transmission unit. The transmission housing can be formed from a metal such as, for example, an iron material. The machine housing can have a second housing part which is configured as a motor housing and/or as a grip housing. The motor housing can receive and mount a drive unit. The grip housing can be provided to form a grip region for an operator to grip around the hand-held power tool.

The drive unit has, in particular, a drive shaft. The drive shaft is provided to extend along a drive axis and to rotate about the drive axis. The drive unit has a drive rotor which drives the drive axis or forms the latter. The drive unit has a drive stator. The drive stator is mounted such that it cannot rotate in the machine housing, in particular the second housing part.

"Protruding into" is to be understood to mean, in particular, that the bearing unit is arranged, in an assembled state of the hand-held power tool, at least partially in the first housing part. In particular, a radial plane of the drive axis which runs along an interface of the first and the second housing part intersects the bearing unit. In particular, the bearing unit protrudes at least 2 mm, in particular at least 4 mm, preferably at least 6 mm, with preference at least 8 mm, particularly preferably at least 10 mm, with further preference at least 12 mm, into the first housing part.

The bearing unit can have a bearing housing. The bearing housing can be configured as a bearing cap or as a bearing plate. The bearing housing can be provided to mount the drive unit, in particular in the axial and/or radial direction of the drive axis, with respect to the machine housing. The bearing unit can be provided to connect the drive unit fixedly for conjoint rotation to the machine housing, in particular the first housing part and/or the second housing part.

In particular, the bearing unit is provided to orient or to position the drive unit with respect to the transmission unit.

In particular, the hand-held power tool has a hand-held power tool apparatus which is configured as a drive unit mount. The hand-held power tool apparatus is provided to mount the drive unit in the housing, in particular the machine housing.

The disclosure specifies further expedient developments of the hand-held power tool according to the disclosure and/or the hand-held power tool apparatus.

It can be expedient that the first housing part and/or the second housing part overlap/overlaps the bearing unit, in particular in the axial direction, and in particular completely. In particular, the first housing part can overlap the bearing unit, in particular in the axial direction. The bearing unit is preferably surrounded so as to lie on the inside, that is to say by the machine housing, in particular completely. In particular, the bearing unit is surrounded by the first housing part and/or the second housing part.

Furthermore, it can be expedient that the bearing unit is mounted between the first housing part and the second housing part, in particular is prestressed in the axial direction. In particular, the bearing unit is set or prestressed in the axial direction of the drive axis with respect to the first housing part and the second housing part. As an alternative, the bearing unit can also be set or prestressed in one of the two housing parts.

In particular, the bearing unit, in particular the bearing housing, is connected in a positively locking and/or non-positive manner to the drive unit, in particular a drive stator of the drive unit.

It can be expedient that the bearing housing is of pot-shaped configuration. In particular, the bearing housing surrounds the drive unit at least partially, in particular the drive stator.

The bearing unit is preferably provided to be supported in the axial direction in a radially inner region on the first housing part and in a radially outer region on the second housing part. In particular, a radial plane of the drive axis which runs along the interface of the first and the second housing part intersects the bearing unit. The bearing unit has a radially inner region and a radially outer region. The radially inner region is of at least partially hollow-cylindrical configuration. The radially inner region forms a substantially hollow-cylindrical inner part body. The radially outer region forms a substantially hollow-cylindrical outer part body. The inner part body is connected to the outer part body by means of a supporting structure, in particular a supporting rib.

The radially inner region can extend, starting from the drive axis, in a range of from 0% to approximately 50%, in particular to approximately 60%, of a maximum extent of the bearing unit. The radially outer region can extend, starting from the drive axis, in a range of from approximately 50%, in particular of from approximately 60%, preferably of from approximately 70%, with preference of from approximately 80%, to 100% of a maximum extent of the bearing unit.

Furthermore, it can be expedient that the bearing unit has a centering element. In particular, the centering element protrudes into the first housing part. The centering element can be of hollow-cylindrical configuration. The centering element can limit a radial extent of the bearing unit. The centering element can be arranged in a radially inner region of the bearing unit.

The centering element can have an, in particular, at least substantially cylindrical bearing recess. The bearing recess can be provided to receive a drive shaft of the drive unit. The bearing recess can be provided to surround and to mount the drive shaft.

The first housing part can be provided to center the bearing unit, in particular in the radial direction of the drive axis. The first housing part can have a centering recess which is provided to center the bearing unit, in particular the centering element of the bearing unit. The centering recess can be provided to receive the centering element.

The centering element can have a centering bevel which runs around, in particular, in the circumferential direction of the centering element and is provided to guide the centering element into the centering recess of the first housing part. As a result, particularly accurate and simple centering of the bearing unit in the machine housing, in particular in the first housing part, is possible, as a result of which particularly accurate positioning and alignment of the transmission unit are made possible. As a result, excessive wear or even a failure of the transmission unit can be avoided.

Furthermore, it can be expedient that the bearing unit, in particular the bearing housing, has a first stop element. In particular, the first stop element is provided to form an axial stop, in particular with the first housing part. The first stop element is preferably configured as a stop shoulder. The first stop element is preferably arranged in a radially inner region of the bearing unit. The stop element can have a stop face which is, in particular, circularly annular. The first stop element is provided to form a stop with (in particular, the interior of) the first housing part. The first stop element is provided to define a spacing of the bearing unit and therefore of the drive unit with respect to the transmission unit. As a result, the bearing unit can be positioned exactly in a particularly simple and reliable way.

The first stop element can adjoin the centering element in the radial direction and/or can delimit the centering element.

It is proposed that the bearing unit and/or the drive unit are/is cantilever-mounted. In particular, the bearing unit and/or the drive unit are/is cantilever-mounted in a side which faces away from the first housing part. The drive unit and/or the bearing unit are/is preferably mounted on the machine housing in such a way that the drive unit has a fixed end and a cantilevered or free end which faces away from the fixed end. The bearing unit and/or the drive unit preferably do/does not have, on a side which faces away from the first transmission part, a supporting structure which supports the drive unit with respect to the machine housing, in particular the second housing part. In particular, the bearing unit and the drive unit protrude into the second housing part on a side which faces away from the first housing part. Here, in particular, the bearing unit, in particular the further bearing housing of the bearing unit, and the drive unit are configured spaced apart in the radial direction of the drive axis from the machine housing, in particular the second housing part. As a result, improved all-round circulation of the bearing unit and the drive unit can be made possible.

Cantilever-mounting is to be understood to mean, in particular, that an action of force takes place outside or not between the mounting element/elements. For example, the bearing unit can be mounted in such a way that the bearing unit projects at least in sections from a mounting element or the machine housing. In particular, the bearing unit can be mounted, in particular by means of the drive unit, on a side which points toward the first housing part, and can project freely or can have no further mounting or supporting structure on the side which faces away from the first housing part.

The bearing unit can be provided to mount the drive unit, in particular a drive shaft of the drive unit, in particular to mount by means of a fixed/floating mounting. It goes without saying that other mountings which appear to be appropriate to a person skilled in the art also come into question, such as, for example, a floating mounting or set or braced mounting. The bearing unit can be provided to receive the drive unit as a closed system, with the result that the bearing unit can be received in the machine housing without a further mounting or a further mounting element, for example of the drive shaft.

It can be expedient that the bearing unit has a further or second bearing housing which is spaced apart in the radial direction, in particular completely, from the machine housing, in particular the second housing part. In particular, the further bearing housing is arranged spaced apart or floating freely with respect to the machine housing. The further bearing housing is surrounded by the machine housing, in particular the second housing part. The further bearing housing can be provided to space the drive unit apart from the machine housing. The further bearing housing is spaced apart in the axial direction from the bearing housing. In particular, the further bearing housing is arranged on a side which faces away from the first housing part. The bearing housing and the further bearing housing can be connected to one another by means of a screw connection.

It can be expedient that the bearing unit has a first mounting element, in particular an anti-friction mounting element, which is provided to mount a/the drive shaft of the drive unit. It goes without saying that other mounting elements which appear appropriate to a person skilled in the art such as, for example, plain mounting elements, can also be used. In particular, the first mounting element is arranged between a transmission unit and the drive unit, in particular the drive stator, and is provided to mount the drive shaft. In particular, a radial plane of the drive axis which runs along the first mounting element intersects the first housing part and the bearing unit, in particular the bearing housing of the bearing unit. As a result, the drive unit can be mounted in a particularly compact manner.

Furthermore, it can be expedient that the first mounting element is separated or spaced apart, in particular in the axial direction, by way of a bearing housing of the bearing unit from the first housing part, in particular the transmission housing. In particular, the first mounting element is arranged spaced apart from the first housing part. The first mounting element is preferably arranged in the bearing recess of the first housing part. The first mounting element is preferably surrounded by the first transmission housing, in particular completely. Further preferably, the first mounting element is surrounded by the bearing housing, and the bearing housing is surrounded by the first housing part. As a result, a compatibility of the bearing unit with other hand-held power tools, in particular transmission units, can be provided. The first mounting element is preferably arranged in the centering recess of the first housing part and/or is surrounded by the latter. As a result, the bearing unit can be used as a component in different component series. Furthermore, positioning of the bearing unit in the machine housing can be made possible in a particularly simple way by means of the bearing unit. In one alternative embodiment, the first mounting element can be separated partially, in particular in the axial direction, by way of a bearing housing of the bearing unit from the first housing part, in particular the transmission housing. Here, the mounting element can make contact at least partially or in sections with the first housing part, by there being, for example, contact points, at which the mounting element is flush with the bearing housing or projects with respect to the bearing housing.

Furthermore, it can be expedient that the bearing housing of the bearing unit is formed from a plastic. The bearing housing is preferably provided to position the first mounting element with respect to the transmission unit. The first mounting element can be overmolded by the bearing housing. In particular, the first mounting element is surrounded by the bearing housing, and is preferably connected to the latter in a positively locking and/or integrally joined manner. The first mounting element can form a fixed bearing. A section through the first housing part along a radial plane with respect to the drive axis intersects the bearing housing and the first mounting element. The first mounting element can be arranged at least substantially in the first housing part. As a result, the first housing part can be of particularly simple design, by a bearing seat for the first mounting element in the first housing part being dispensed with and it being possible for any securing elements for a transmission-side mount to be omitted. Furthermore, it can be expedient that the first mounting element protrudes further in the axial direction into the first housing part than the first stop element, in particular a stop face of the stop element. A section through the first housing part along a radial plane with respect to the drive axis intersects the first stop element and the first mounting element. A further section through the first housing part along a radial plane with respect to the drive axis intersects the first mounting element, but not the first stop element. As a result, the drive unit can protrude to a particularly great extent into the first housing part.

It is proposed that the hand-held power tool has a fan unit, in particular a fan impeller element, which is arranged between the first mounting element and the drive unit, in particular the drive stator. The fan unit has a fan impeller element which is provided to form an air stream. The bearing unit, in particular the bearing housing, can surround the mounting element and the fan unit. The fan unit is preferably surrounded by the bearing unit, in particular completely.

Furthermore, it is proposed that the bearing unit has a positively locking element which is provided to hold the bearing unit with respect to the first housing part and/or the second housing part. The positively locking element can be provided to secure a movement of the bearing unit with respect to the second housing part in the circumferential direction about the drive axis. The positively locking element can be provided to form an anti-rotation safeguard. The positively locking element can be configured as a radial elevation which projects in the radial direction. The positively locking element can delimit a radial extent of the bearing unit, in particular of the bearing housing. Four positively locking elements are preferably provided. The positively locking elements can be spaced apart from one another at least by 40° in the circumferential direction.

Furthermore, it is proposed that the bearing unit, in particular the bearing housing, has a second stop element. In particular, the second stop element is provided to form an axial stop, in particular with the second housing part. The second stop element is preferably configured as a stop shoulder. The second stop element is preferably arranged in a radially outer region, in particular of the bearing unit. The second stop element is preferably configured as a stop shoulder. The second stop element can have a stop face which runs, in particular, transversely, preferably perpendicularly, with respect to an axial direction. The second stop element is provided to form a stop with the interior of the second housing part. In particular, the second stop element is provided to set the bearing unit in the axial direction, in particular to brace it. In particular, the second stop face faces away from the first stop face. As a result, the bearing unit can be positioned exactly in a particularly simple and reliable way.

Furthermore, it is provided that the positively locking element and the second stop element are configured in one piece. The positively locking element is held, in particular prestressed, on the second housing part by means of a screw connection. The first housing part and the second housing part are connected, in particular prestressed, in the axial direction by means of a screw connection. In particular, the bearing unit, in particular the bearing housing, is prestressed in the axial direction by way of the screw connection between the first housing part and the second housing part. As a result, the drive unit can be fixed in the axial direction, as a result of which through the use of, in particular, a plurality of screw connections, tilting can be prevented tilting and high forces can be absorbed.

It can be expedient that the drive unit and/or the bearing unit have/has, in particular on a side which faces away from the first housing part, a circumferential region which can be flowed around by an air stream. In particular, the drive unit and/or the bearing unit are/is arranged or mounted in the machine housing in such a way that the drive unit and/or the bearing unit are/is arranged at least substantially, in particular completely, spaced apart from the machine housing, in particular the second housing part, in the circumferential direction in a region which faces away from the first housing part. The circumferential region can be formed or arranged on a side of the drive unit, which side faces away from the first housing part.

Furthermore, it is proposed that the hand-held power tool has an air introduction opening which is provided to conduct an air stream in such a way that a circumferential region of the drive unit and/or of the bearing unit are/is flowed around, in particular in the axial direction.

The air introduction opening is preferably provided to conduct the air stream from the circumferential region of the drive unit into the bearing unit.

In particular, the circumferential region of the drive axis and the machine housing form an air stream space which is provided to guide an air stream along the drive unit. The air stream space preferably has a substantially circularly annular cross section which runs around the drive unit. The air stream space can be provided to receive the air stream. As a result, a cooling air quantity which flows through the hand-held power tool can be increased.

Furthermore, it can be expedient that the bearing unit, in particular the bearing housing, surrounds the drive unit in the circumferential direction, in particular substantially completely, and is connected to the drive unit in a positively locking and/or non-positive manner.

The air stream is preferably provided to flow around the drive unit, in particular a drive stator, in the axial direction, in particular completely.

In particular, the drive unit is arranged in the machine housing in such a way that an air stream surrounds or flows around a circumferential face or a shell face of the bearing unit and/or the drive unit.

The air introduction opening is preferably provided to conduct the air stream on the circumferential region along the drive unit. As a result, it can be ensured that an air stream quantity which is provided to flow through the hand-held power tool increases. Furthermore, improved air guidance and, as a result, improved cooling of at least the drive unit are made possible.

It can be expedient that the air introduction opening is provided to suck in an air stream in the radial direction from a circumferential region of the drive unit. In particular, the air stream is conducted in a manner which is directed toward the drive shaft. "Sucking in" is to be understood to mean, in particular, that an air stream is generated by way of a negative pressure.

It can be expedient that the drive unit is mounted on the machine housing in such a way that a circumferential region of the drive unit can be flowed around substantially, in particular in the axial direction, by an air stream. The drive unit is mounted on the machine housing by means of a bearing unit in such a way that the drive unit projects freely or does not have a supporting structure on a side which faces away from the first housing part, in particular of the transmission unit. As a result, an air stream can be generated in a particularly simple and reliable manner, by it being possible for the air stream to flow around the drive unit in an unimpeded manner.

It can be expedient that the air introduction opening is formed by the bearing unit and extends, in particular, in the circumferential direction along the bearing unit. The air introduction opening is provided to conduct the air stream in the radial direction.

Furthermore, it can be expedient that the air conducting opening is arranged on a circumferential region of the bearing unit and extends in the circumferential direction along the bearing unit. In particular, the air introduction opening is provided to conduct the air stream from a circumferential region of the bearing unit, in particular the bearing housing, in the radial direction toward the drive axis. The air introduction opening can be provided to conduct the air stream through the bearing unit, in particular the bearing housing.

Furthermore, it can be expedient that the hand-held power tool has a transmission unit, the air introduction opening being arranged in the axial direction between the transmission unit and the drive unit, in particular a drive stator. As a result, the air stream can be conducted in the axial direction along the entire length of the drive unit, in order to cool the drive unit.

It is proposed that the hand-held power tool has an air guiding disk, in particular with an air guiding recess, which is provided to conduct the air stream in the axial direction through the air guiding disk. The air guiding disk is configured as a circularly annular disk. The air guiding recess can be arranged in a central region. Furthermore, it can be expedient that the air introduction opening is delimited in the axial direction by a/the air guiding disk. In particular, the air guiding disk adjoins the bearing unit in the radial direction, in particular the bearing housing. The air guiding disk preferably delimits the air guiding opening in the axial direction. The air guiding disk is preferably arranged in a radially outer region of the bearing unit, which radially outer region faces away from the circumferential region of the bearing unit. Further preferably, the air guiding disk is provided to conduct the air stream in the radial direction to the drive axis and in the axial direction along the drive axis and past the air guiding disk.

In particular, the air guiding disk is arranged between the drive stator and the fan unit, in particular the fan impeller element. The fan impeller element is preferably configured as a radial fan. The air guiding disk preferably adjoins the bearing unit in the radial direction. Further preferably, the air guiding disk adjoins the air guiding opening in the radial direction. Further preferably, the air guiding disk is spaced apart from the drive shaft, in particular in the radial direction, in particular is spaced apart in such a way that the air stream is guided along the drive shaft through the air guiding disk. The air guiding recess receives, in particular, the drive shaft, and forms an air passage for the air stream between the drive shaft and the air guiding recess. In particular, the air guiding recess is provided to conduct the air stream between the air guiding disk and the drive shaft in the axial direction. The air guiding disk is preferably provided to reduce a fan cross section, in order to increase a negative pressure or flow velocity. As a result, a flow velocity of the air stream can be increased in a particularly simple way.

Furthermore, it is proposed that the bearing unit surrounds the drive unit, in particular a stator of the drive unit, preferably completely. In particular, the bearing unit covers or overlaps the drive unit. The bearing unit, in particular the bearing housing, is connected in a positively locking and/or non-positive manner to the drive unit, in particular the drive stator.

Furthermore, it is proposed that the drive unit, in particular the stator of the drive unit, has a region on a circumferential region or on a shell face, which region is not surrounded by the bearing unit, in particular the bearing housing.

The bearing unit can have a further or second bearing housing. The bearing housing and the second bearing housing can be provided to mount the drive unit. The bearing housing and the second bearing housing can be provided to surround the drive unit in the axial direction. The bearing housing can be configured as a bearing cap or as bearing plates. The bearing housing can receive a first end of the drive unit, and the second bearing housing can receive a second end which faces away from the first end. The two bearing housings engage around the drive unit, in particular the drive stator, at least partially in the axial direction. The two bearing housings are spaced apart from one another in the axial direction. The bearing housing surrounds the drive unit in the circumferential direction at the first end of the drive unit. The second bearing housing surrounds the drive unit in the circumferential direction at the first end of the drive unit. The region which, in particular, is not surrounded by the two bearing housings can be configured between the first and the second bearing housing. As a result, improved cooling of the drive unit in a circumferential region of the drive unit can be made possible. In particular, the bearing housing forms a first bearing housing of the bearing unit.

It can be expedient that the bearing unit, in particular the bearing housing, has an air discharge opening which is provided to conduct the air stream and/or the further air stream out of the bearing unit. In particular, the air discharge opening is arranged in a radial section of the bearing unit. The air discharge opening is preferably delimited, in particular in the circumferential direction, by way of a supporting structure, in particular a supporting rib, which supports a radially inner region of the bearing unit, in particular inner part body, from a radially outer region of the bearing unit, in particular outer part body. The air discharge opening is delimited in the radial direction by way of the inner part body and the outer part body. The air discharge opening is delimited in a circumferential direction around the drive axis by way of the supporting structure, in particular the supporting rib. The supporting structure, in particular the supporting rib, is configured in such a way that an outflow which is as optimum as possible of the air stream from the bearing unit is made possible.

Further preferably, the air guiding disk is provided to conduct a further or second air stream into the air stream and to combine these two air streams. The air introduction opening is provided to divide an air stream which enters into the hand-held power tool into a first air stream and a second air stream. The first air stream is provided to surround or to flow around the drive unit. The second air stream is provided to flow through the drive unit. The first air stream can be configured on the circumferential region of the drive unit and/or bearing unit. The second air stream can be configured between the drive shaft and the drive stator. As a result, the drive unit is flowed through or flowed around both on the inside and on the outside. In addition, a divided air stream can ensure that a part of the air stream which is affected by dirt particles and metal dust is not guided through the motor.

In particular, the hand-held power tool has a bounding wall between the machine housing, in particular the first housing part, and the mounting unit, in particular the mounting housing, which bounding wall is provided to delimit the circumferential region, in particular in the axial direction. In particular, the bounding wall is provided to seal the circumferential region, in particular the flow space, in the axial direction with respect to a passage of air, in particular by means of the first air stream. The bounding wall can be configured as a housing shoulder which, in particular, protrudes inward in the radial direction. The bounding wall preferably adjoins the bearing unit directly.

Furthermore, the disclosure relates to a hand-held power tool apparatus, in particular a drive unit mount, for a hand-held power tool with a drive unit, which has a drive shaft, and a bearing unit for mounting the drive unit, the drive shaft having a first end with a receiving region for receiving a transmission element and with a threaded element for connecting the transmission element, and a second end which faces away from the first end.

It can be expedient that the second end has a torque receiving region for the connection of the transmission element.

In principle, the torque receiving region can be provided to tighten a threaded nut for fastening the transmission element to the drive shaft, by the threaded nut being loaded with a first torque and the torque receiving region being loaded with a torque which is opposed to the first torque. As a result, the transmission element can be connected particularly simply to the drive shaft, without it being necessary for a torque receiving region to be provided on the drive shaft, in particular between the threaded nut and the drive unit or the drive stator. As a result, the overall design can be particularly compact, since the torque receiving region is displaced to the second end.

As a result, in the axial direction, the threaded nut can directly adjoin the transmission element, and the transmission element can directly adjoin the mounting element.

In particular, the torque receiving region is provided, in an assembled state, to apply a torque to the drive shaft or to form a countertorque with respect to a torque which is applied to the drive shaft. In particular, the torque can be applied to the torque receiving region by means of a tool, such as, for example, an open-ended wrench.

The threaded element can preferably be connected releasably, in particular can be connected releasably by means of a screw connection.

It can be expedient that the bearing unit, in particular a first bearing housing, has a bearing recess. The bearing unit, in particular the first bearing housing, surrounds the drive unit, in particular the drive shaft, at the first end.

Furthermore, it can be expedient that the bearing recess has a radial extent which is smaller, in particular by at least 1%, preferably at least 3%, with preference at least 5%, particularly preferably at least 8%, than a radial extent of the threaded element. The assembly of the transmission element can therefore begin only when the first bearing housing is connected to the drive unit. In order for it to be possible for a torque which is produced in the case of a screw connection to be counteracted, the protruding torque receiving region is provided at the second end of the drive shaft. As a result, a drive unit and bearing unit which are particularly compact and, in particular, capable of being preassembled can be provided.

Furthermore, it can be expedient that the bearing recess surrounds a first bearing seat which is provided to receive a first mounting element for mounting the drive shaft. The first mounting element is connected in a non-positive and/or positively locking manner to the bearing unit, in particular the first bearing housing. The first mounting element is surrounded by the bearing unit, in particular the first bearing housing. The first bearing seat is preferably provided to form a fixed mounting. The first mounting element is provided to be set or prestressed in the axial direction by way of a shaft shoulder on one side and by way of the transmission element on the other side.

Furthermore, it can be expedient that the torque transmission region projects, in particular at the second end, in particular in the axial direction with respect to the bearing unit, in particular a second bearing housing.

It is proposed that the torque receiving region has a driving profile which is provided to form a positively locking connection for torque receiving. The positively locking element can be provided to apply a countertorque on the second side of the drive shaft, in order to connect the threaded element to the drive shaft on the first side. The driving profile, in particular a cross section of the driving profile, can be configured as an internal profile or as an external profile. The driving profile can be configured as an internal dihedron, an internal square or an internal hexagon. The driving profile can be configured as an external dihedron, an external square or an external hexagon.

Furthermore, it is proposed that the torque receiving region adjoins, in the axial direction, a bearing seat for receiving a second mounting element of the drive unit.

It can be expedient that the bearing seat is surrounded by a bearing unit, in particular the second bearing housing. The bearing seat is preferably provided to form a floating mounting.

Furthermore, it can be expedient that the first end of the drive shaft, in particular the threaded element, is cantilever-mounted.

Furthermore, it can be expedient that the transmission element is seated directly on the drive shaft. There is preferably no intermediate shaft or adapter shaft which receives the transmission element and connects it to the drive shaft. The transmission unit can be pressed on the drive shaft, in particular by means of a press fit. The transmission unit can be connected in the circumferential direction in a positively locking manner to the drive shaft. A particularly compact drive unit can be provided as a result.

BRIEF DESCRIPTION OF THE DRAWINGS

Further advantages result from the following description of the drawing. Exemplary embodiments of the disclosure are shown in the drawing. The drawings, the description and the claims contain numerous features in combination. A person skilled in the art will also expediently consider the features individually and combine them to form appropriate further combinations. In the drawing:

In the following figures, identical components are provided with the identical designations.

Detailed Description

Figure 1:
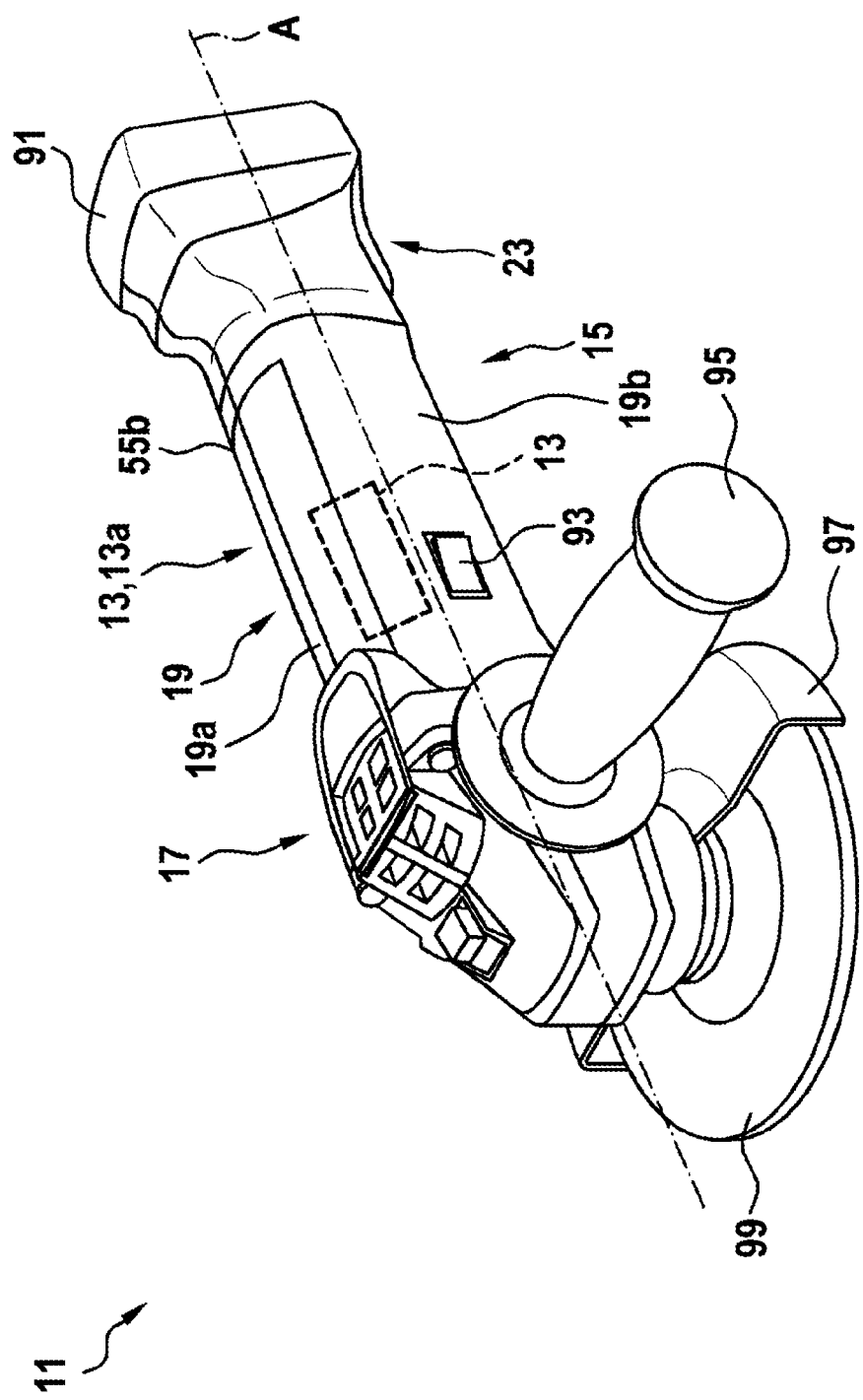
FIG. 1 shows a perspective view of a hand-held power tool.

FIG. 1 shows a hand-held power tool 11 which is configured as an angle grinder with a drive unit 13, with a machine housing 15 and with a bearing unit 25 for mounting the drive unit 13. The machine housing 15 forms an outer housing of the hand-held power tool 11. The machine housing 15 has a first housing part 17 which is configured as a transmission housing and a second housing part 19 which surrounds the drive unit 13. The second housing part 19 surrounds a transmission unit 21 and is formed from a metal.

The second housing part 19 surrounds the drive unit 13 and comprises a grip region 23 for gripping the hand-held power tool 11. The second housing part 19 is provided to be gripped around by an operator. The second housing part 19 is formed from two housing half shells 19a, 19b. The second housing part 19 has a first end which adjoins the first housing part 17, and a second end which faces away from the first end and can be connected to a battery apparatus 91 which is configured as a battery pack. Furthermore, the second housing part 19 comprises an actuating element 93 which is configured as an on/off switch and is provided to switch the drive unit on/off. Furthermore, the hand-held power tool 11 has an additional handle 95 and a protective hood 97 and an accessory tool 99 which is surrounded at least partially by the protective hood 97 and is configured as a grinding disk.

Figure 2:
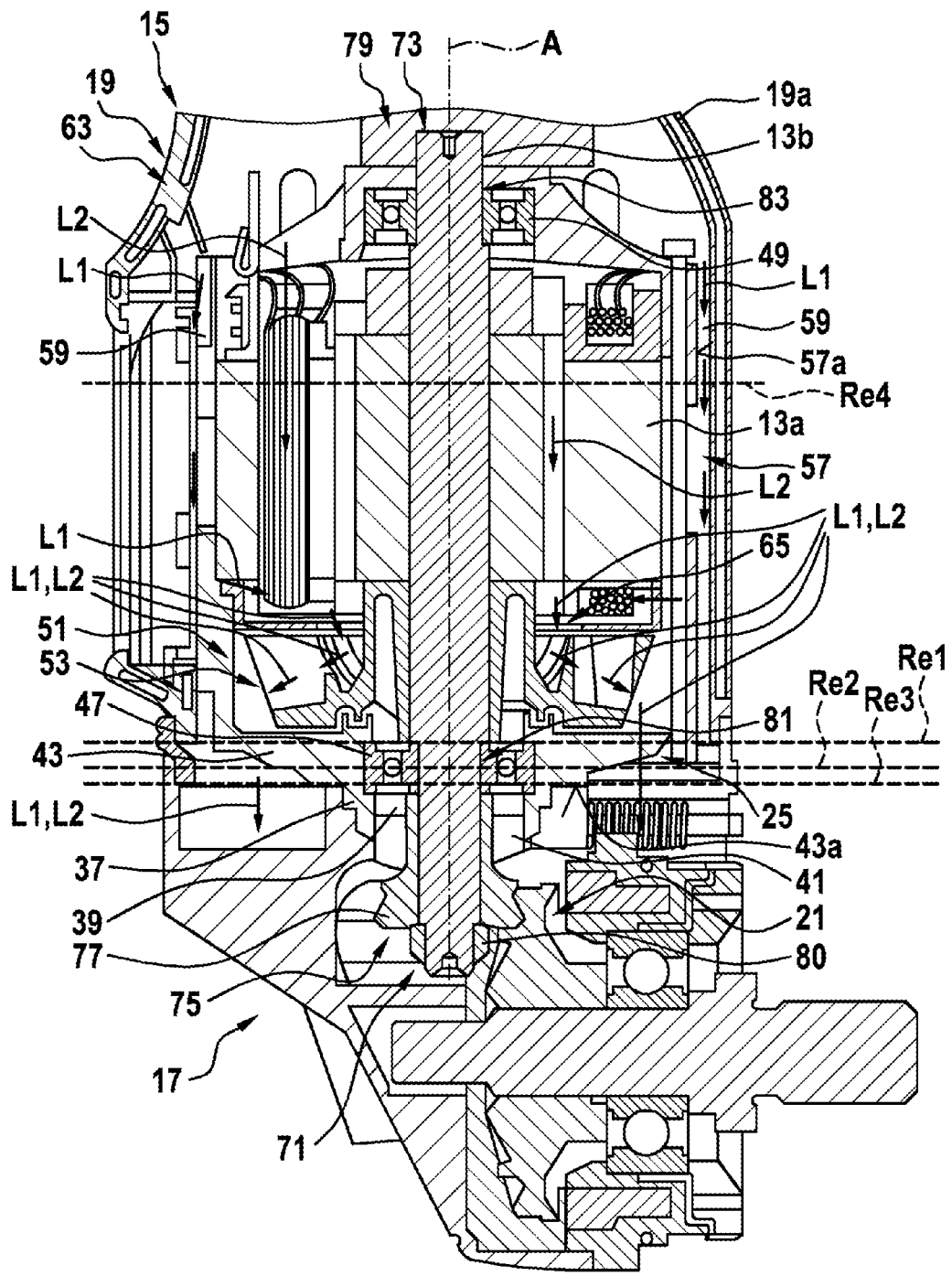
FIGS. 2 to 3 in each case show a section through the hand-held power tool from FIG. 1, FIGS. 4 to 5 in each case show a view of a bearing unit and a drive unit of the hand-held power tool from FIG. 1, FIGS. 6 to 7 in each case show a section through a bearing unit and a drive unit of the hand-held power tool from FIG. 1, and FIGS. 9 to 10 in each case show an exploded view of the hand-held power tool.

The hand-held power tool 11 has a bearing unit 25 with a bearing housing 27 which is arranged substantially in the second housing part 19 and is provided to protrude into the first housing part 17. In an assembled state of the hand-held power tool 11, the bearing housing 27 is arranged partially in the first housing part 17. Here a radial plane Re1 of the drive axis A which runs along the interface of the first and the second housing part 19 intersects the bearing housing 27 (FIG. 2). The bearing housing 27 protrudes by at least 10 mm into the first housing part 17.

The bearing housing 27 is configured as a bearing cap or as a bearing plate. The bearing housing 27 can be provided to mount the drive unit 13, in particular in the axial and radial direction of the drive axis A, with respect to the first and the second housing part 19. The bearing housing 27 is provided to orient or to position the drive unit 13 with respect to the transmission unit 21. The bearing housing 27 is connected in a positively locking manner to the drive stator 13a.

The drive unit 13 has a drive shaft 13b which is provided to extend along a drive axis A and to rotate around the drive axis A. The drive shaft 13b can form a drive rotor 13b. The drive unit 13 has a drive stator 13a which is mounted such that it cannot rotate with respect to the second housing part 19. The hand-held power tool 11 extends substantially along the drive axis A.

The first housing part 17 and the second housing part 19 overlap the bearing housing 27 in the axial direction along the drive axis A. The bearing housing 27 is surrounded so as to lie on the inside, that is to say completely, by the machine housing 15. The bearing housing 27 is arranged between the first housing part 17 and the second housing part 19, and is prestressed in the axial direction along the drive axis A with respect to the first housing part 17 and the second housing part 19. The bearing housing 27 is of pot-shaped configuration and surrounds the drive stator 13a partially.

The bearing housing 27 is provided to be supported in the axial direction in a radially inner region 31 on the first housing part 17 and in a radially outer region 33 on the second housing part 19. The bearing housing 27 has a radially inner region 31 which forms an inner part body, and a radially outer region 33 which forms an outer part body (FIGS. 4 to 9). The regions are of substantially hollow-cylindrical configuration. The inner part body is connected to the outer part body by way of a plurality of supporting ribs 35 which extend in the radial direction and form a supporting structure 35.

Figure 10:
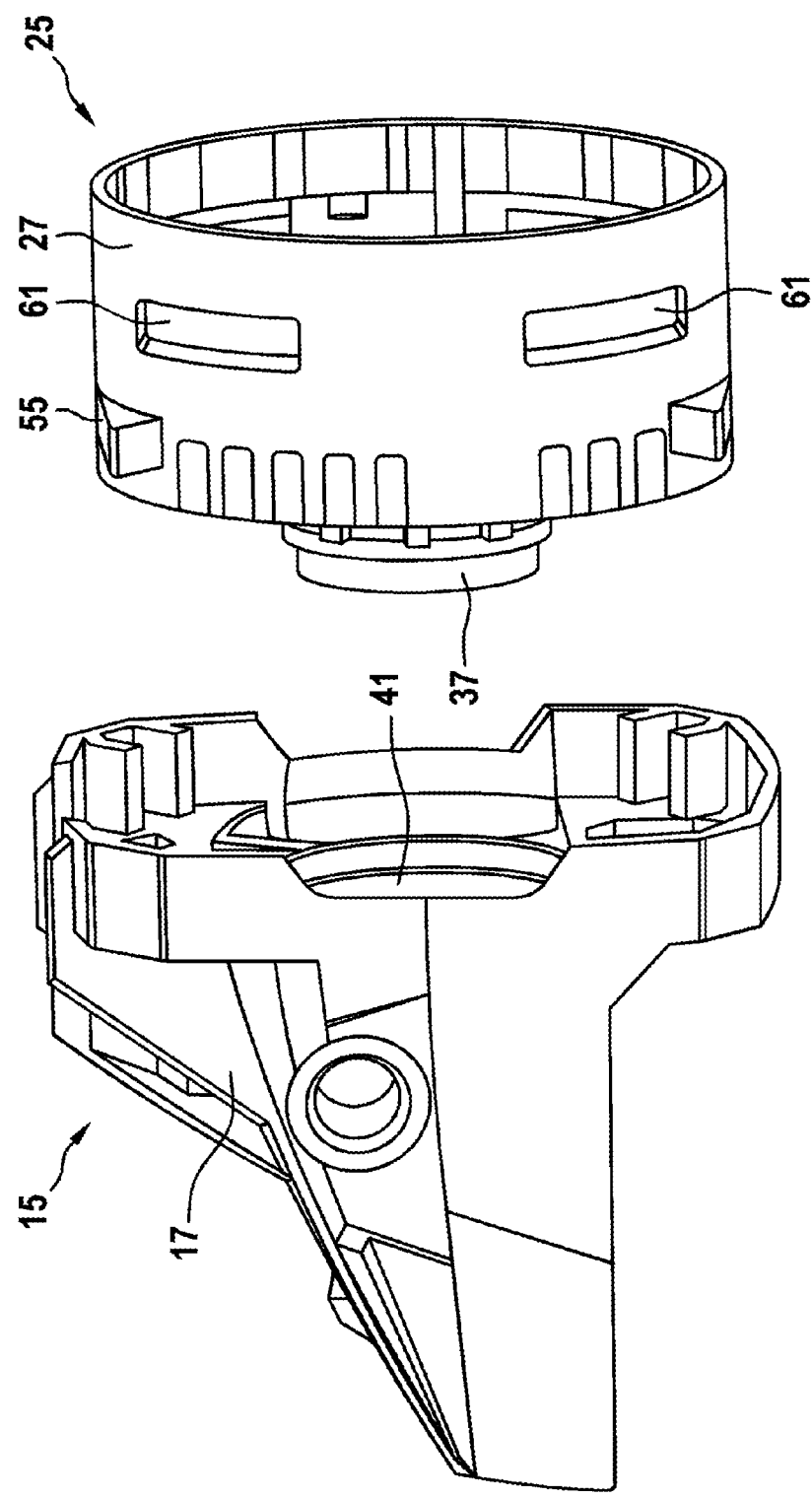

The bearing housing 27 has a centering element 37 which is formed by way of the inner part body. The centering element 37 is of substantially hollow-cylindrical configuration and protrudes into the first housing part 17, in order to form a centering means of the bearing housing 27 with the first housing part 17. The centering element 37 has a substantially cylindrical bearing recess 39 which delimits a radial extent of the bearing housing 27 (FIG. 10). The bearing recess 39 is provided to receive a drive shaft 13b of the drive unit 13 and to surround it.

The first housing part 17 is provided to center the bearing housing 27 in the radial direction of the drive axis A. The first housing part 17 has a centering recess 41 which is provided to center the centering element 37 of the bearing housing 27 (FIG. 2). The centering recess 41 is provided to receive the centering element 37, the centering element 37 having a centering bevel which runs around in the circumferential direction of the centering element 37 and is provided to guide the centering element 37 into the centering recess 41 of the first housing part 17.

The bearing housing 27 has a first stop element 43 which is provided to form an axial stop with the first housing part 17. The first stop element 43 is arranged on the inner part body and is configured as a stop shoulder. The first stop element 43 has a circularly annular stop face 43a. The first stop element 43 is provided to form a stop with the interior of the first housing part 17. The first stop element 43 is arranged so as to lie radially on the inside. The first stop element 43 is provided to specify a spacing of the bearing unit 25 and therefore of the drive unit 13 with respect to the transmission unit 21. The first stop element 43 adjoins the centering element 37 in the radial direction and delimits it.

Figure 3:
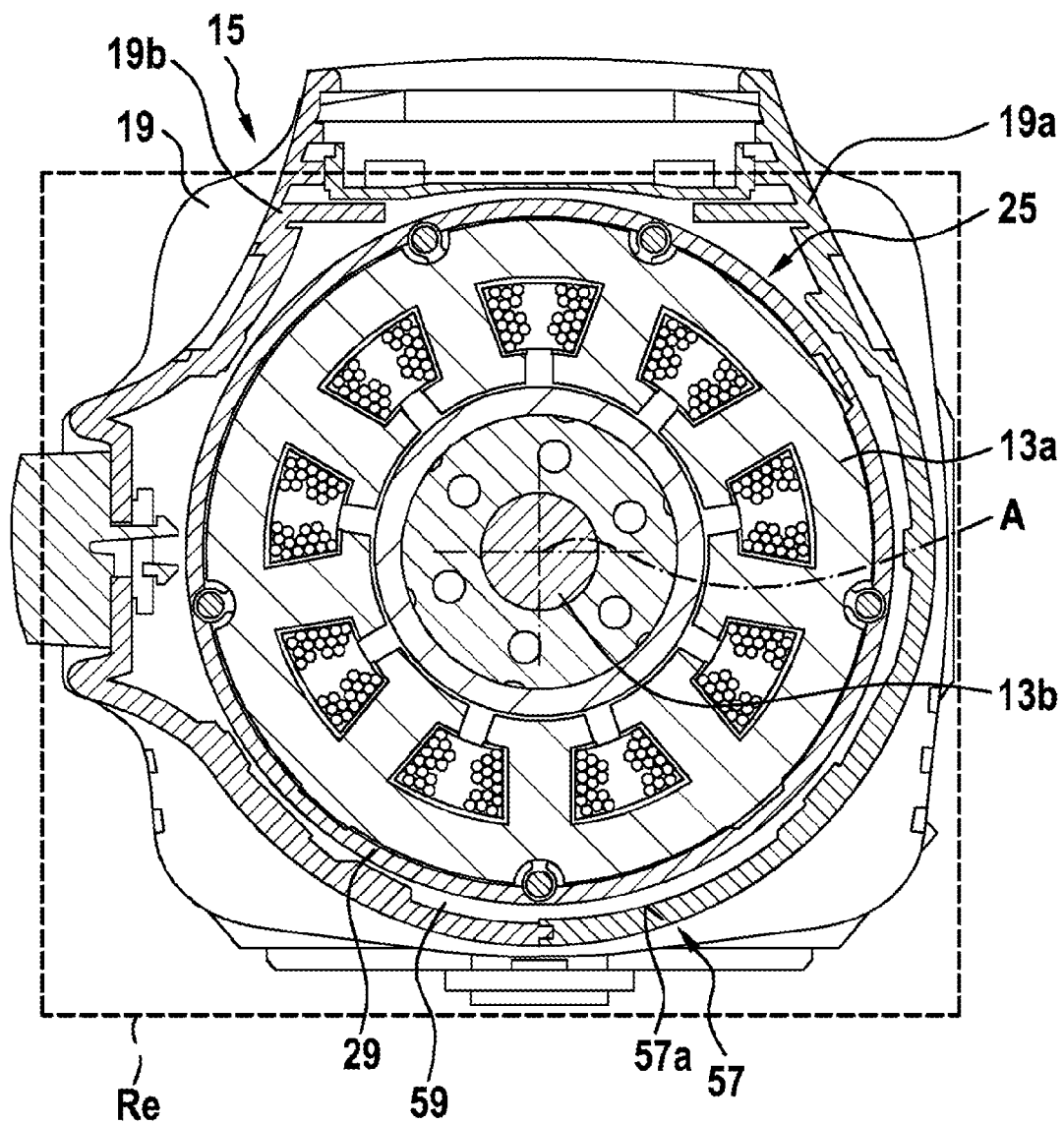

The bearing housing 27 and the drive unit 13 are cantilever-mounted with respect to the machine housing 15 and the second housing part 19. The bearing housing 27 and the drive unit 13 are cantilever-mounted in a side which faces away from the first housing part 17. The bearing unit 25 and the drive unit 13 are mounted on the machine housing 15 in such a way that the drive unit 13 has a fixed end and a cantilevered or free end which faces away from the fixed end. The bearing unit 25 and/or the drive unit 13 do/does not have, on a side which faces away from the first housing part 17, a supporting structure 35 which supports the drive unit 13 with respect to the second housing part 19. The bearing unit 25 and the drive unit 13 protrude into the second housing part 19 on a side which faces away from the first housing part 17. The bearing unit 25 and the drive unit 13 are configured so as to be spaced apart at the free end in the radial direction of the drive axis A from the second housing part 19. Here, a radial plane Re4 of the drive axis A which runs through a further or second bearing housing 19 intersects the drive stator of the drive unit 13 and the second housing part 19 (FIG. 3).

The bearing housing 27 is provided to mount the drive unit 13 including the drive shaft 13b by means of a fixed/floating mounting. The bearing unit 25 is provided to receive the drive unit 13 as a closed system, with the result that the bearing unit 25 is mounted in the machine housing 15 without further mounting by means of a further mounting element.

The bearing unit 25 has a first mounting element 47 which is configured as an anti-friction mounting element and is provided to mount the drive shaft 13b. The first mounting element 47 is arranged between a transmission unit 21 and the drive stator 13a and is provided to mount the drive shaft 13b. A radial plane Re2 of the drive axis A which runs through the first mounting element 47 intersects the first housing part 17 and the bearing housing 27 of the bearing unit 25 (FIG. 2).

The first mounting element 47 is separated from the first housing part 17 by way of the bearing housing 27 and is arranged spaced apart from the first housing part 17, 19. The first mounting element 47 is arranged in the centering recess 41 of the first housing part 17 and is surrounded partially by the first housing part 17. The first mounting element 47 is arranged in the bearing recess 39 of the first housing part 17. A radial plane Re2 of the drive axis A which runs through the first mounting element 47 intersects the first housing part 17, the bearing housing 27 of the bearing unit 25, the centering recess 41 of the first housing part 17, and the bearing recess 39 of the bearing housing 27. The first mounting element 47 is surrounded completely by the first housing part 41. The first mounting element 47 is surrounded completely in the axial direction by the bearing housing 27 of the bearing unit 25, and the bearing housing 27 is surrounded partially in the axial direction by the first housing part 17. Here, the bearing housing 27 is formed from a plastic. The bearing housing 27 is provided to position the first mounting element 47 with respect to the transmission unit 21. The first mounting element 47 is overmolded by the bearing housing 27, and is connected in a positively locking and/or non-positive manner to the bearing housing 27. The first mounting element 47 forms a fixed bearing. The first mounting element 47 is arranged at least substantially in the first housing part 17.

The first mounting element 47 protrudes further into the first housing part 17 in the axial direction in comparison with the first stop element 43, and projects with respect to the stop element 43. A radial plane Re3 of the drive axis A which runs along the first stop intersects the first housing part 17 and the first stop element 43.

The hand-held power tool 11 has a fan unit 51 which is arranged in the axial direction between the first mounting element 47 and the drive stator 13a. The fan unit 51 has a fan impeller element 53 which is provided to form an air stream L1. The bearing housing 27 surrounds the fan impeller element 53 completely in the axial direction.

Figure 4:
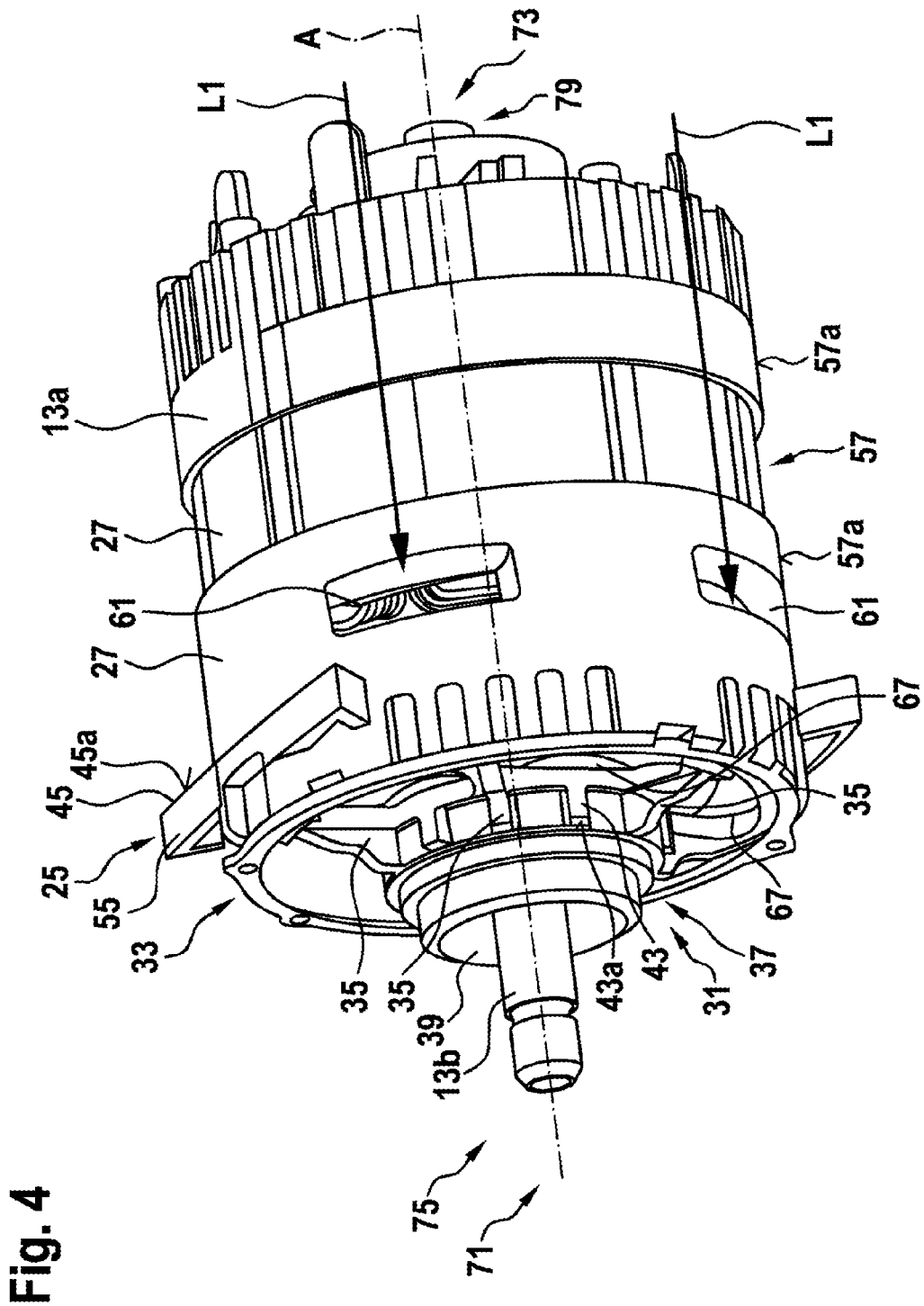
Figure 5:
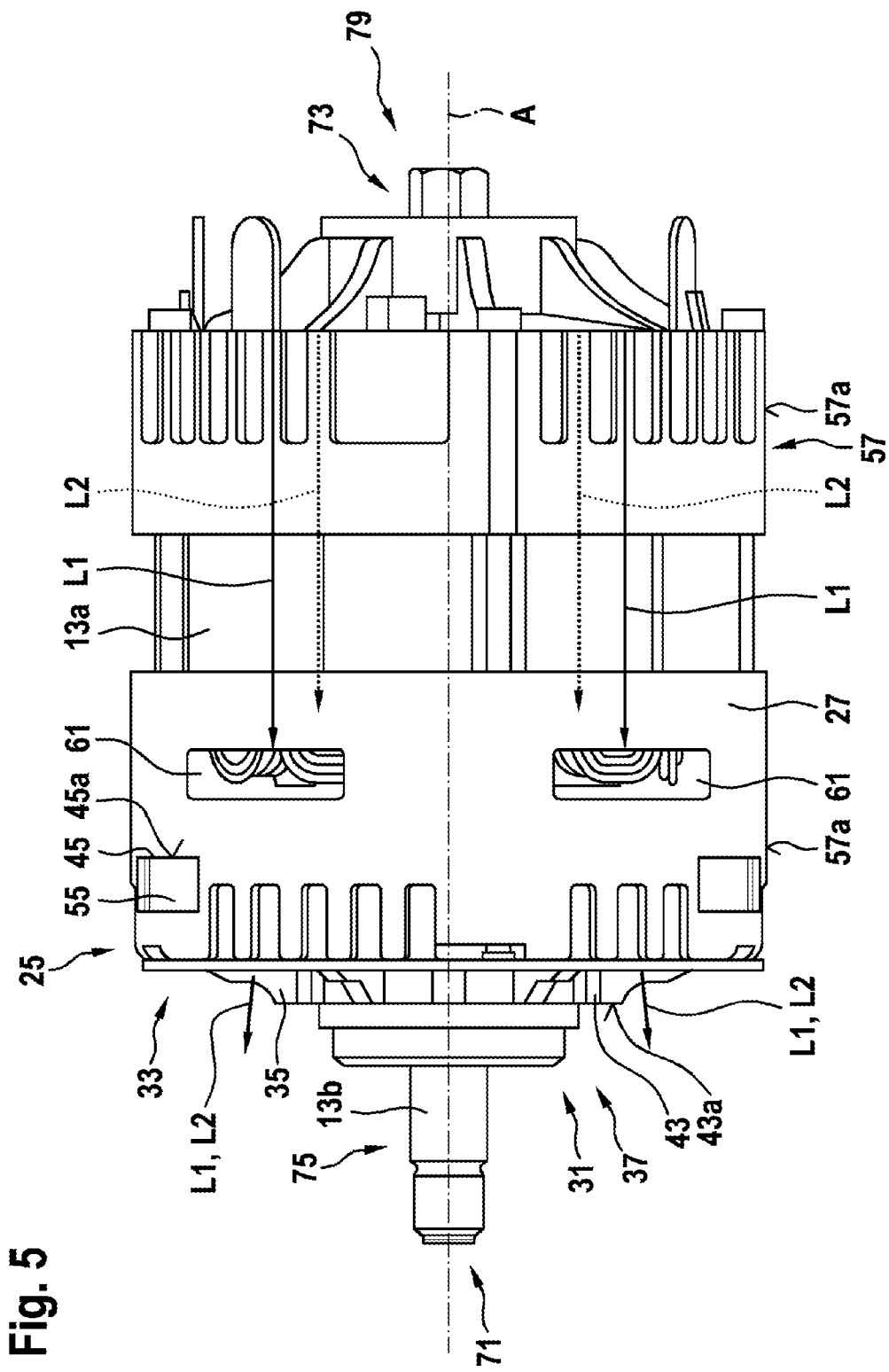
Figure 6:
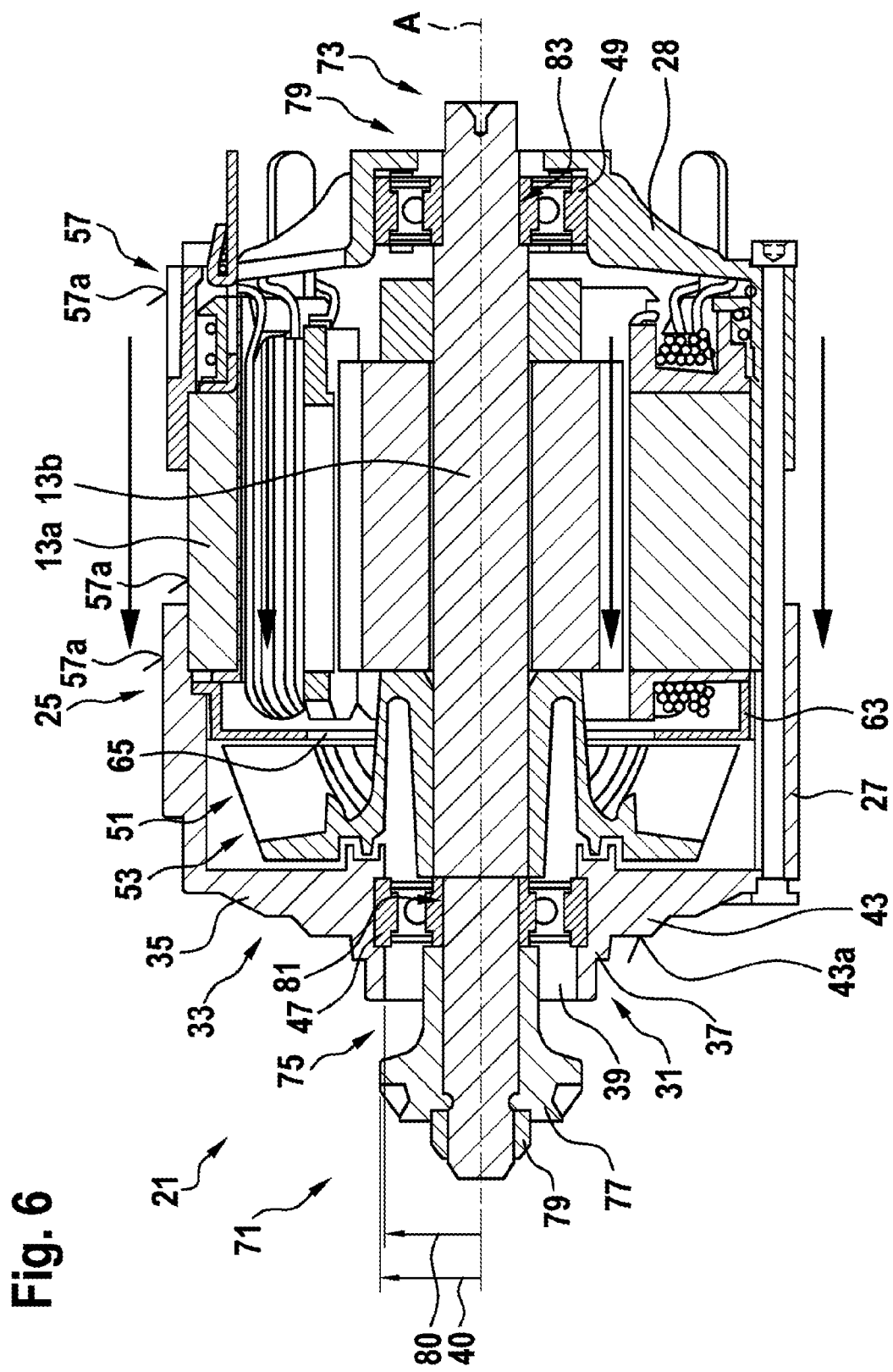

The bearing housing 27 has a positively locking element 55 which is configured as an elevation 55 and is provided to hold the bearing unit 25 with respect to the second housing part 19 (FIG. 4). The elevation 55 is provided to secure a movement of the bearing housing 27 with respect to the second housing part 19 in the circumferential direction around the drive axis A. The elevation 55 is provided to form an anti-rotation safeguard of the bearing housing 27. The elevation 55 is configured as a radial ridge which projects in the radial direction. The elevation 55 delimits a radial extent of the bearing housing 27. Four elevations 55 are preferably provided. The elevations 55 can be spaced apart from one another in the circumferential direction at least by 40°. In each case two elevations 55 are arranged on sides of the bearing housing 27 which face away from one another.

The bearing housing 27 has a second stop element 45. The second stop element 45 is provided to form an axial stop with the second housing part 19. The second stop element 45 is configured as a stop shoulder, and is arranged in a radially outer region 33 of the bearing housing 27. The second stop element 45 is configured as a stop shoulder. The second stop element 45 has a stop face 45a which runs perpendicularly with respect to an axial direction. The second stop element 45 is provided to form a stop with the interior of the second housing part 19. The second stop element 45 is provided to brace the bearing unit 25 in the axial direction. The second stop face 45a faces away from the first stop face 43a. The bearing housing 17 has the two stop elements 43, 45.

The elevation 55 and the second stop element 45 are configured in one piece. The elevations 55 are prestressed in the axial direction by means of a screw connection. The first and the second housing part 19 are connected in the axial direction by means of a screw connection. The bearing housing 27 and, in particular, the first and second stop element 45 are prestressed in the axial direction by way of the screw connection between the first housing part 17 and the second housing part 19.

The drive unit 13 and the bearing unit have, on a side which faces away from the first housing part 17, a circumferential region 57 which can be flowed around by an air stream L1. The drive unit 13 is arranged or mounted in the machine housing 15 in such a way that the drive unit 13 is arranged at least substantially spaced apart in the circumferential direction from the second housing part 19 in a region which faces away from the first housing part 17. The circumferential region 57 is arranged on a side of the drive unit 13, which side faces away from the first housing part 17.

The circumferential region 57 of the drive unit 13 and of the bearing unit 27 and the machine housing 15 form an air stream space 59 which is provided to guide an air stream L1 substantially along the drive unit 13. The air stream space 59 has a substantially circularly annular cross section which runs around the drive unit 13.

The bearing unit 25 surrounds the drive unit 13 in the circumferential direction substantially completely, and is connected in a positively locking and/or non-positive manner to the drive unit 13.

The air introduction opening 61 is provided to conduct an air stream L1 in such a way that a circumferential region 57 of the drive unit 13 and of the bearing housing 27 is flowed around in the axial direction. The air introduction opening 61 is provided to conduct the air stream L1 from the circumferential region 57 of the bearing housing 27 into an interior or into an inner region of the bearing housing 27. The air stream L1 is provided to flow around the drive stator 13*a* in the axial direction, in particular completely. The drive unit 13 is arranged in the machine housing 15 in such a way that the air stream L1 surrounds or flows around a circumferential face 57*a* of the bearing unit 25 and of the drive unit 13.

The drive unit 13 is mounted on the machine housing 15 in such a way that a circumferential region 57 of the drive unit 13 can be flowed around substantially by an air stream L1 in the axial direction. The drive unit 13 is mounted by means of a bearing unit 25 on the machine housing 15 in such a way that the drive unit 13 projects freely in a side which faces away from the transmission unit 21 and does not have a supporting structure 35.

The air introduction opening 61 is formed by the bearing housing 27 and extends in the circumferential direction along the bearing housing 27. The air introduction opening 61 is provided to conduct the air stream L1 in the radial direction. The air introduction opening is on a circumferential region 57 of the bearing unit 25 and extends in the circumferential direction along the bearing unit 25. The air introduction opening 61 is provided to conduct the air stream L1 from a circumferential region 57 of the bearing housing 27 in the radial direction toward the drive axis A. The air introduction opening 61 is provided to conduct the air stream L1 through the bearing housing 27.

The air introduction opening 61 is arranged in the axial direction between the transmission unit 21 and the drive stator 13*a*.

The hand-held power tool 11 has an air guiding disk 63 with an air guiding recess 65 which is provided to conduct the air stream L1 in the axial direction through the air guiding disk 63. The air guiding disk 63 is configured as a circularly annular disk. The air guiding recess 65 is arranged in a central region. The air introduction opening 61 is delimited in the axial direction by a/the air guiding disk 63. The air guiding disk 63 adjoins the bearing housing 27 in the radial direction. The air guiding disk 63 delimits the air guiding opening in the axial direction. The air guiding disk 63 is arranged in a radially outer region 33 of the bearing unit 25, which radially outer region 33 faces away from the circumferential region 57 of the bearing unit 25. The air guiding disk 63 is provided to conduct the air stream L1 in the radial direction toward the drive axis A and in the axial direction along the drive axis A and past the air guiding disk 63.

The air guiding disk 63 is arranged between the drive stator 13*a* and the fan impeller element 53. The fan impeller element 53 is configured as a radial fan. The air guiding disk 63 adjoins the bearing unit 25 and the air guiding opening in the radial direction. The air guiding disk 63 is spaced apart from the drive shaft 13*b* in such a way that the air stream L1 is guided along the drive shaft 13*b* through the air guiding disk 63. The air guiding recess 65 receives the drive shaft 13*b* and forms an air passage for the air stream L1 between the drive shaft 13*b* and the air guiding recess 65. The air guiding recess 65 is provided to conduct the air stream L1, L2 between the air guiding disk 63 and the drive shaft 13*b* in the axial direction.

On a circumferential region 57 or on a shell face, the drive unit 13, in particular the drive stator 13*a*, has a region which is not surrounded by the bearing housing 27.

The bearing housing 27 has an air discharge opening 65 which is provided to conduct the air stream L1 out of the bearing unit 25. The air discharge opening 67 is arranged in a radial section of the bearing unit 25. The air discharge opening 67 is delimited in the circumferential direction by way of a supporting structure 35, in particular a supporting rib, which supports a radially inner region 31 of the bearing unit 25, in particular inner part body, from a radially outer region 33 of the bearing unit 25, in particular outer part body. The air discharge opening 67 is delimited in the radial direction by way of the inner part body, the outer part body and, in a circumferential direction around the drive axis A, by way of the supporting ribs 35. The supporting ribs 35 are configured in such a way that an outflow which is as optimum as possible of the air stream L1 from the bearing unit 25 is made possible.

Figure 7:
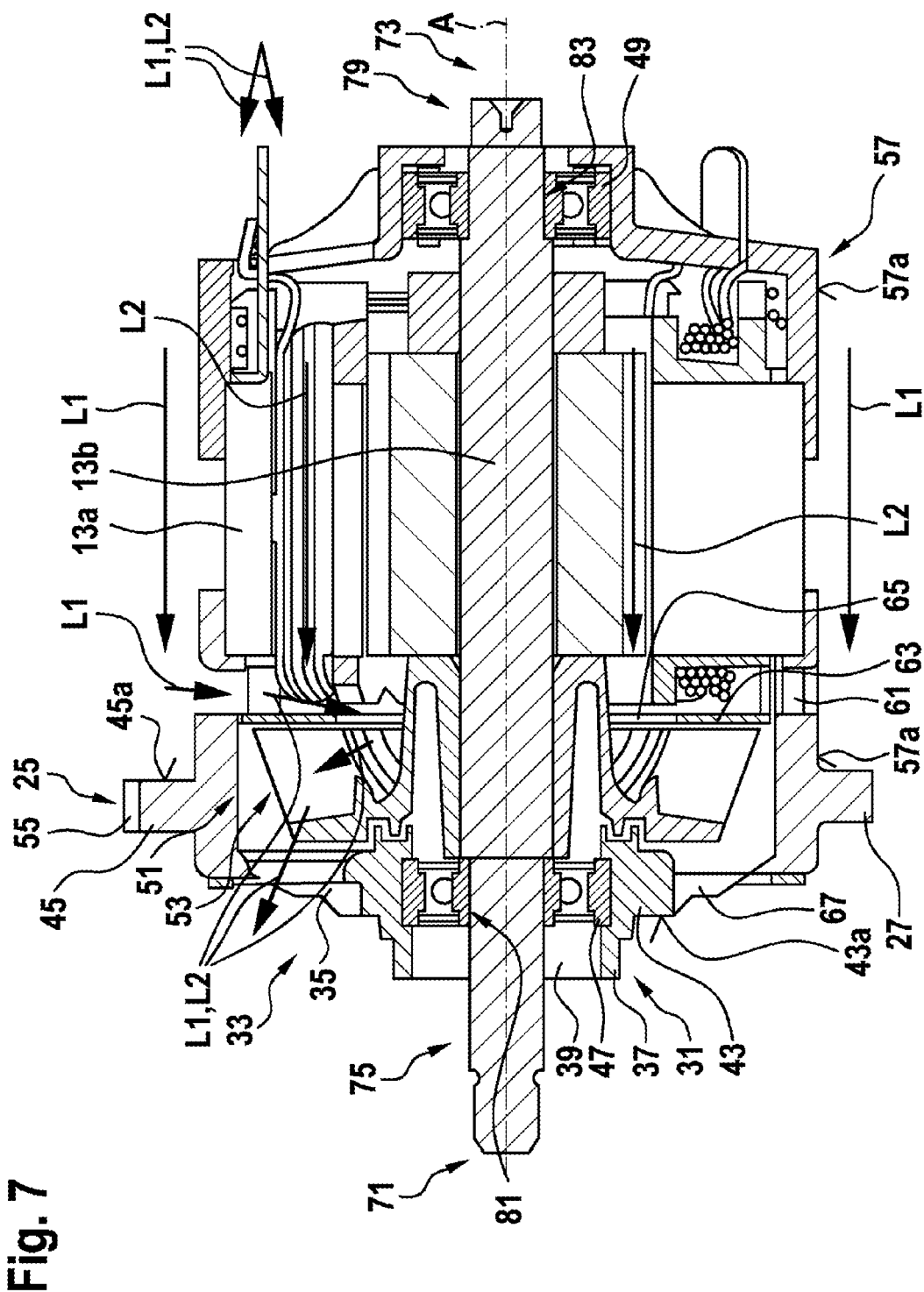
Figure 8:
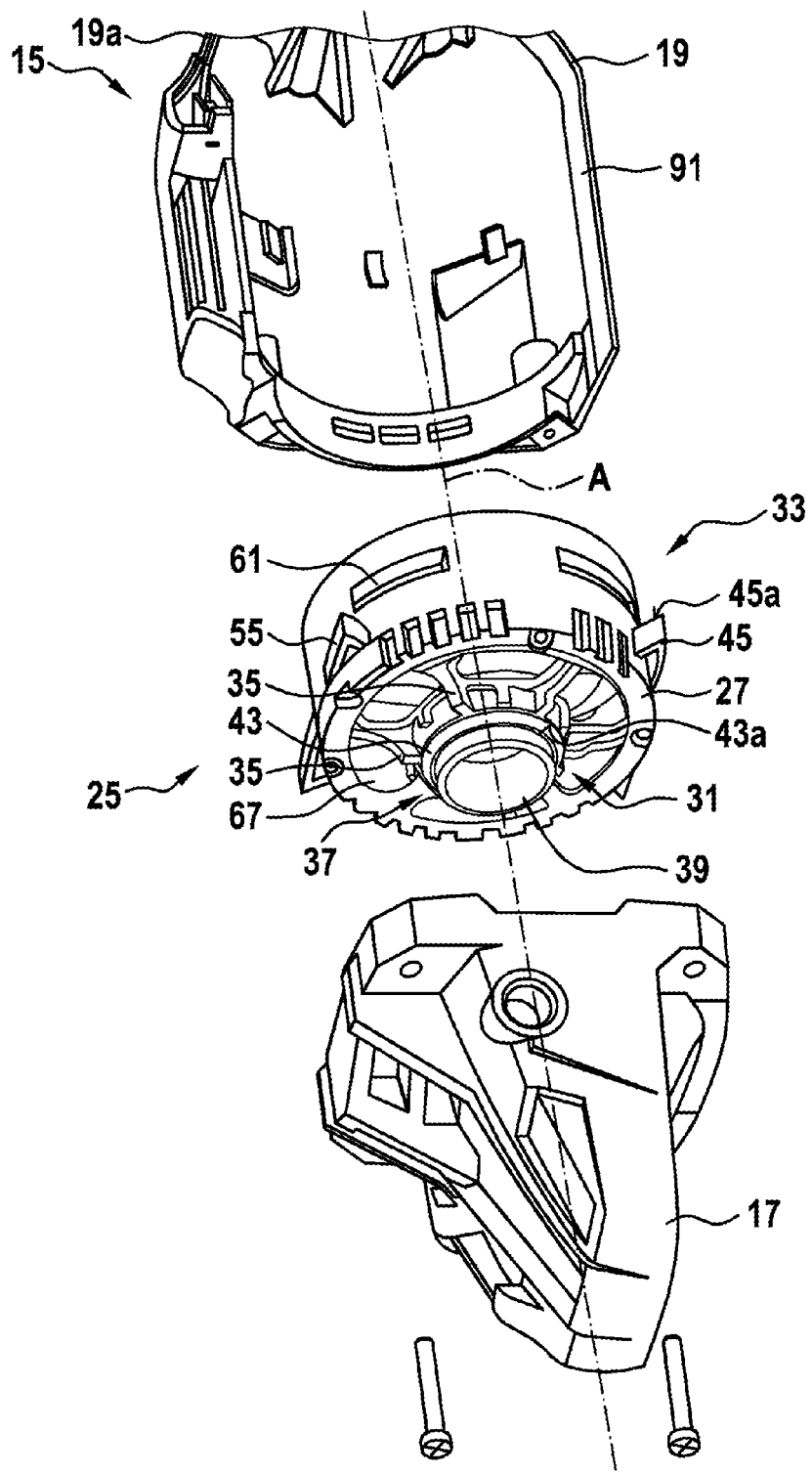
Figure 9:
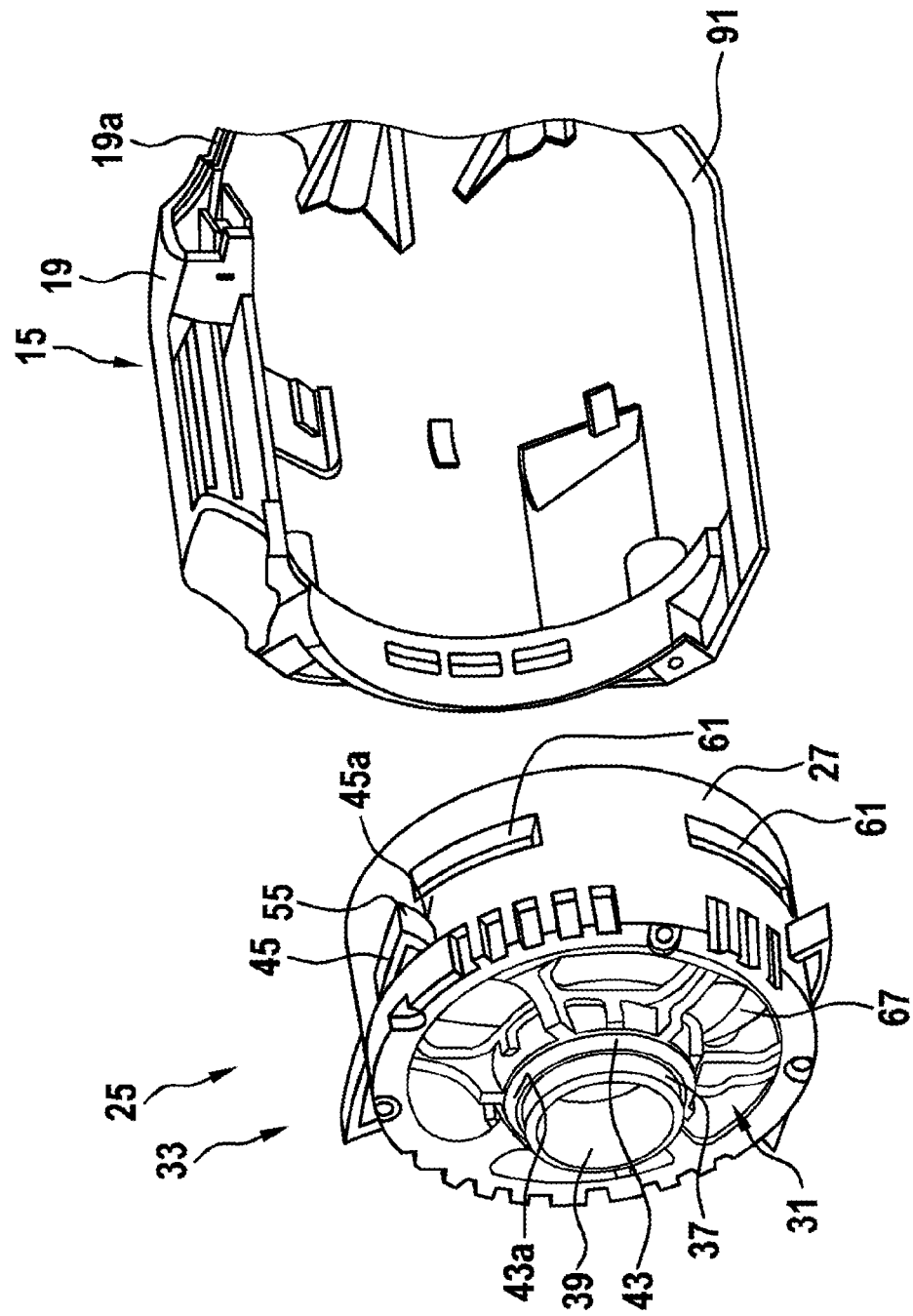

The air guiding disk 63 is provided to conduct a further air stream L2 into the air stream L1 and to combine them. The air introduction opening 61 is provided to divide an air stream L1, L2 which enters into the hand-held power tool 11 into a first air stream L1 and a second air stream L2. The first air stream L1 is provided to surround or to flow around the drive unit 13. The second air stream L2 is provided to flow through the drive unit 13. The first air stream L1 is configured around the circumferential region 57 of the drive unit 13. The second air stream L2 is configured between the drive shaft 13*b* and the drive stator 13*a* (FIG. 7).

The first housing part 17 has a bounding wall 19 which is arranged between the first housing part 17 and the bearing housing 27. The bounding wall 91 delimits the circumferential region 57 in the axial direction. The bounding wall 91 is provided to seal the circumferential region 57, which is configured as a flow space 59, in the axial direction with respect to an air passage by means of the first air stream L1. The bounding wall 91 is configured as a housing shoulder which projects inward in the radial direction. The bounding wall 91 preferably adjoins the bearing housing 27 directly.

Furthermore, the hand-held power tool 11 comprises a hand-held power tool apparatus which forms a closed drive unit mounting. The hand-held power tool apparatus is configured as a closed drive system. The hand-held power tool apparatus is formed by way of the drive unit 13 with the drive shaft 13b and by way of the bearing unit 25 for mounting the drive unit 13.

The drive shaft 13b has a first end 71 with a receiving region 75 for receiving a transmission element 77 and with a threaded element 80 for connecting the transmission element 77, and a second end 73 which faces away from the first end 71. The second end 71 has a torque receiving region 79 for connecting the transmission element 77. The torque receiving region 79 is provided, in an assembly state, to apply a torque to the drive shaft 13b or to form a countertorque to a torque which is applied to the drive shaft 13b.

The threaded element 80 can be connected releasably to the drive shaft 13b by means of a screw connection which is configured as a shaft nut.

The first bearing housing 27 surrounds the drive unit 13 and the drive shaft 13b at the first end 71.

The bearing recess 39 has a radial extent 40 which is smaller by at least 3% than a radial extent 80 of the threaded element 79, with the result that assembly of the transmission element 77 can take place only when the first bearing housing 27 is connected to the drive unit 13. In order for it to be possible for a torque which is produced in the case of a screw connection to be counteracted, the projecting torque receiving region is provided at the second end 73 of the drive shaft 13b. In particular, the bearing recess 39 has a smaller diameter than a maximum diameter of the threaded element 79.

The bearing recess 39 surrounds a first bearing seat 81 which is provided to receive the first mounting element 47 for mounting of the drive shaft 13b. Here, the first mounting element 47 is connected to the first bearing housing 27 in a non-positive and/or positively locking manner. The first mounting element 47 is surrounded by the first bearing housing 27. The first bearing seat 81 is provided to form a fixed mounting. The first mounting element 47, 49 is provided to be set or prestressed in the axial direction by way of a shaft shoulder on one side and by way of the transmission element 77 on the other side.

The torque transmission region 79 projects at the second end 73 in the axial direction with respect to the bearing unit 25, a second bearing housing 27.

The torque receiving region 79 has a driving profile which is provided to form a positively locking connection for torque receiving. The driving profile is provided to apply a countertorque on the second side of the drive shaft 13b, in order to connect the transmission element 77 to the drive shaft 13b at the first end 71. The driving profile has a cross section which is configured as an external hexagon.

Furthermore, it is proposed that the torque receiving region 79 adjoins, in the axial direction, a bearing seat 83 for receiving the second mounting element 49 of the drive unit 13.

The torque receiving region 79 has a recess which is provided to form a positively locking element 55 for receiving torque. The positively locking element 55 is provided to apply a countertorque on the second side of the drive shaft 13b, in order to connect the threaded element 80 to the drive shaft 13b on the first side.

The torque receiving region 79 delimits the drive shaft 13b in the axial direction along the drive axis A.

The torque receiving region 79 adjoins a bearing seat 81 for receiving a mounting element 49 of the drive unit 13.

The bearing seat 83 is surrounded by a second bearing housing 27. The bearing seat 83 is provided to form a floating mounting.

The first end 71 of the drive shaft 13b, the threaded element 80, is cantilever-mounted.

The invention claimed is:

1. A hand-held power tool comprising:
   a drive unit;
   a machine housing comprising a first housing part, which is configured as a transmission housing, and a second housing part, which surrounds the drive unit; and
   a bearing housing, including a first bearing housing portion positioned within the second housing part, the first bearing housing portion configured to mount the drive unit within the first housing part such that the drive unit is supported by an inner side of the second housing part through the first bearing housing portion, wherein the bearing housing includes a second bearing housing portion which protrudes from the first bearing housing portion into the first housing part.

2. The hand-held power tool as claimed in claim 1, wherein at least one of the first housing part and the second housing part overlaps the bearing housing in an axial direction.

3. The hand-held power tool as claimed in claim 1, wherein the bearing housing has a radially inner region and a radially outer region, and the radially inner region is supported in an axial direction directly on the first housing part and the radially outer region is supported in the axial direction directly on the second housing part.

4. The hand-held power tool as claimed in claim 1, wherein the bearing housing has a centering element configured to center the bearing housing with respect to the first housing part.

5. The hand-held power tool as claimed in claim 1, wherein:
   the hand-held power tool further comprises a transmission unit within the transmission housing and operably connected to the drive unit; and
   the bearing housing has a first stop element configured to specify a spacing of the drive unit with respect to the transmission unit.

6. The hand-held power tool as claimed in claim 1, wherein at least one of the bearing housing and the drive unit is cantilever-mounted.

7. The hand-held power tool as claimed in claim 1, wherein the bearing housing is formed from a plastic.

8. The hand-held power tool as claimed in claim 1, wherein the bearing housing has a positively locking element configured to hold the bearing housing with respect to the first housing part and/or the second housing part.

9. The hand-held power tool as claimed in claim 1, wherein the hand-held power tool is an angle grinder.

10. The hand-held power tool as claimed in claim 1, wherein the bearing housing is prestressed in an axial direction between the first housing part and the second housing part.

11. The hand-held power tool as claimed in claim 1, wherein the first bearing housing portion is located, at least in part, directly radially outwardly of a drive stator of the drive unit.

12. The hand-held power tool as claimed in claim 1, wherein the bearing housing houses a first mounting element configured to mount a drive shaft of the drive unit.

13. The hand-held power tool as claimed in claim 12, wherein the first mounting element is separated from the first housing part by the bearing housing.

14. The hand-held power tool as claimed in claim 12, wherein the first mounting element protrudes further into the first housing part in an axial direction than a first stop element of the bearing housing.

15. The hand-held power tool as claimed in claim 12, further comprising:
a fan unit arranged between the first mounting element and the drive unit.

16. The hand-held power tool as claimed in claim 15, wherein the fan unit is arranged between the first mounting element and a drive stator of the drive unit.

17. The hand-held power tool as claimed in claim 1, wherein the bearing housing has a first mounting element, which is configured as an anti-friction mounting element, configured to mount a drive shaft of the drive unit.

18. The hand-held power tool as claimed in claim 17, wherein the first mounting element is separated in an axial direction from the first housing part by the bearing housing.

* * * * *